United States Patent [19]

Hendricks

[11] 4,120,016
[45] Oct. 10, 1978

[54] DETACHABLE CYLINDRICAL POWER SUPPLY FOR INDUCTION TYPE ELECTROSTATIC SPRAY GUN

[75] Inventor: Charles D. Hendricks, Livermore, Calif.

[73] Assignee: PPG Industries, Inc., Pittsburgh, Pa.

[21] Appl. No.: 739,171

[22] Filed: Nov. 5, 1976

[51] Int. Cl.² ............................................. B05B 5/02
[52] U.S. Cl. ................................... 361/228; 361/235; 239/15
[58] Field of Search .......................... 239/3, 15, 291; 361/227, 228, 229, 235

[56] References Cited
U.S. PATENT DOCUMENTS

| 2,302,289 | 11/1942 | Bramston-Cook | 239/15 X |
|---|---|---|---|
| 2,894,691 | 7/1959 | Sedlacsik | 239/291 |
| 3,731,145 | 5/1973 | Senay | 239/15 X |
| 4,004,733 | 1/1977 | Law | 239/15 X |
| 4,033,506 | 7/1977 | Braun | 239/15 |

*Primary Examiner*—Robert W. Saifer
*Attorney, Agent, or Firm*—J. Timothy Keane

[57] ABSTRACT

A light-weight, portable power pack for supplying a high voltage output to an electrostatic spray gun from a low voltage input is disclosed. The power pack is cylindrical in shape with an axial opening adapted to receive the discharge channels of the spray gun so that it may be mounted on and may form a part of the spray gun and is detachable therefrom for replacement purposes. The power pack comprises a power supply circuit including a square wave oscillator connected through a square-loop, tape-wound core transformer to a voltage multiplier network for converting a low voltage DC to a high voltage DC for induction charging of material discharged from the spray gun, the circuit being encapsulated in an epoxy resin material to provide a suitable mounting case therefor. The case is molded into a suitable shape and is attached to the front of the gun by means of screws, bolts, a bayonet type connection or other suitable fastening means, the power pack being provided with external contacts which serve to engage corresponding contacts on the spray gun to provide an electrical connection through the gun to the power source, which may be a battery pack carried by the operator, and to engage coresponding contacts on the inductive charging device for the spray gun. The power pack can form the forward barrel portion of the spray gun with the discharge channels extending through the center of the case, or can be incorporated into detachable accessories such as a gas shroud forming chamber mountable on the forward barrel portion.

14 Claims, 7 Drawing Figures

U.S. Patent  Oct. 10, 1978  Sheet 1 of 2  4,120,016
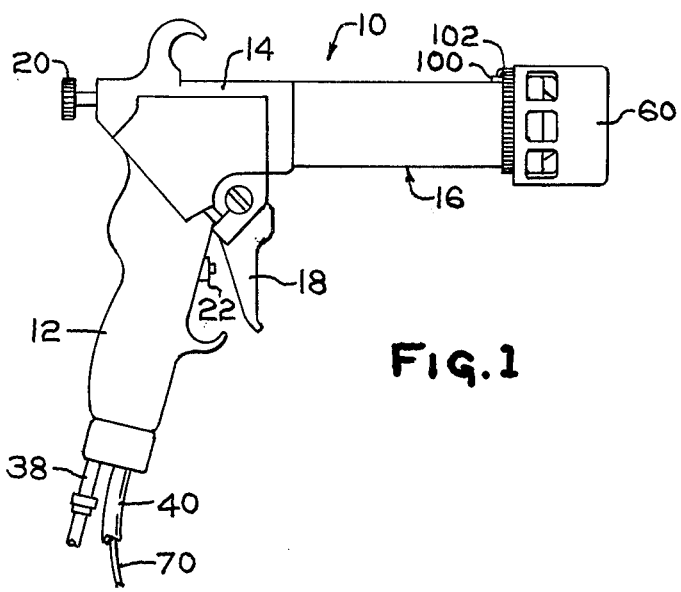
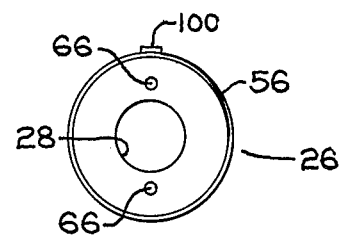
Fig. 1
Fig. 3
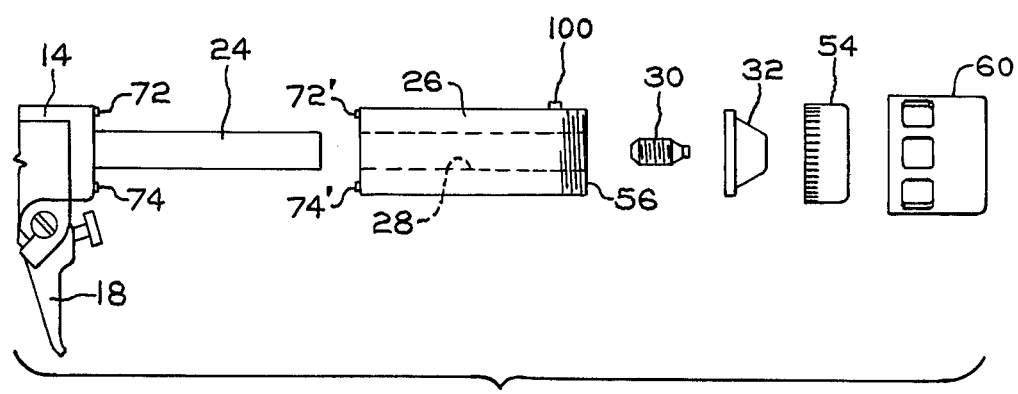
Fig. 2
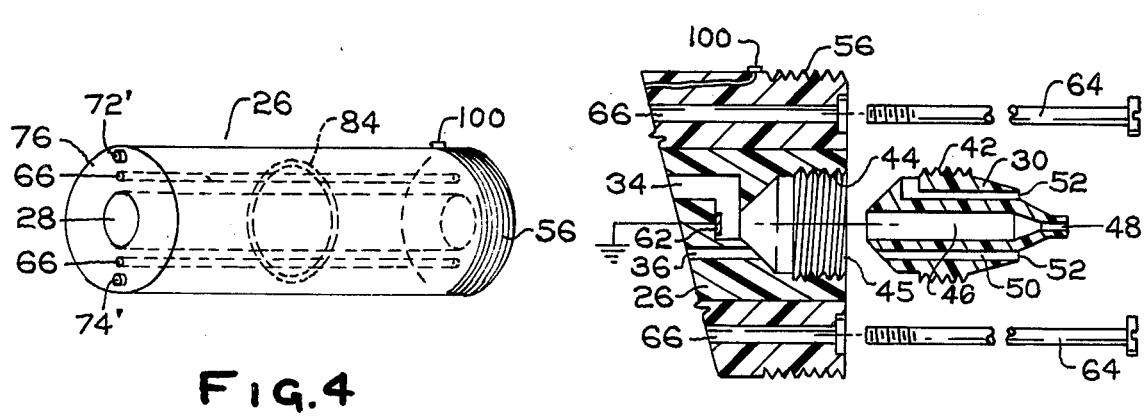
Fig. 4
Fig. 5

DETACHABLE CYLINDRICAL POWER SUPPLY FOR INDUCTION TYPE ELECTROSTATIC SPRAY GUN

BACKGROUND OF THE DISCLOSURE

The present invention relates, in general, to power supplies for electrostatic spray guns, and more particularly to a portable, light-weight, compact power pack formed as a replaceable component of an induction spray gun.

Electrostatic spray guns of various types and configurations are well known in the liquid spraying art and have long been used to spray various materials such as paints, insecticides, and the like. Recent improvements of such devices have been in the area of induction charging devices which serve to induce suitable charges on the spray particles produced by conventional spray guns, the improved devices operating at lower voltages and currents than previously was possible with the conventional corona discharge devices. Induction charging spray guns, to which the present invention has particular reference, are disclosed and claimed in copending application Ser. No. 548,958, now U.S. Pat. No. 4,009,829 of James E. Sickles, filed Feb. 11, 1975 and entitled "Improved Electrostatic Spray Coating Apparatus", and in application Ser. No. 634,386 now abandoned of James E. Sickles, filed Nov. 24, 1975 and entitled "Electrostatic Spray Coating Apparatus", as well as in U.S. Pat. No. 4,073,002 to James E. Sickles et al., entitled "Self Adjusting Power Supply for Induction Charging Electrodes", and application Ser. No. 739,170 of James E. Sickles, filed on even date herewith, entitled "Detachable Power Supply for Induction Type Electrostatic Spray Gun", all of which are assigned to the assignee of the present application.

A discussion of induction charging of spray particles may also be found in U.S. Pat. No. 3,698,634, issued on Oct. 17, 1972 to James E. Sickles. As set forth in the foregoing applications and patents, induction type spray guns have numerous advantages over the prior and conventional corona type spray guns. Principal among these advantages is the fact that the induction type spray gun operates at a substantially lower voltage than does a corona device, induction spray guns utilizing voltages in the range of 10–25 kv with low current requirements while corona devices require voltages of 60 kv and up and have higher current requirements. However, even with such an advantage, a spray gun having exposed electrodes carrying a voltage in the range of 10–25 kv presents certain handling problems, since a voltage in that range can produce arcing and similar effects. Where the power supply for a spray gun is a separate unit from the gun, it becomes necessary to utilize highly insulated electrical cables to safely conduct the required power to the gun. Such leads are relatively heavy and inflexible, particularly with high-voltage corona-type devices, and make it difficult for the operator to handle the gun during a spray coating operation. Although the introduction of induction spray guns has reduced this problem considerably, because of the lower voltage and current requirements of such devices, nevertheless the problem remains, for even these lower voltage levels require substantial insulation for the lead-in cable and within the gun itself.

The power supplies used in the prior art typically are separate units which are extremely heavy, bulky and difficult to move, and which thus restrict the mobility of the spray gun operator to an area that is within reach of the high voltage cable leading from the power supply to the spray gun. The immobility of the power supply and the heavily insulated lead-in cable which are required by the prior art devices to provide relative safety in operation not only cause the spray gun to be awkward to handle, but increase the danger to the operator due to the possibility of breakdown of the insulation in the cable or in the power supply and consequent arcing and sparking problems.

SUMMARY OF THE INVENTION

It is, therefore, an object of the present invention to provide a small, compact, highly portable power supply for an electrostatic spray gun.

Another object of the invention is to provide an inexpensive and replaceable power supply which may be secured to a spray gun and which is sufficiently light in weight that the gun remains easily portable and simple to handle, thereby facilitating the use of the spray gun.

Another object of the invention is to provide a portable power supply which is light in weight, and small, and which may therefore be secured to an induction-type spray gun to convert a low input voltage to a high output voltage at or near the location of the induction charging device, thereby eliminating the need for high voltage lead-in cables.

Still another object of the invention is to provide an induction spray gun which incorporates a light-weight, portable power supply for converting a low DC input voltage to a high DC output voltage at or near the location of the induction charging device, the power supply being in the form of a power pack which is shaped to form the forward barrel portion of the spray gun.

Briefly, the present invention is directed to a power pack for supplying a high voltage output to the charging electrodes of an induction charging device, and to an induction-type electrostatic spray gun which incorporates such a power pack as an integral, but replaceable, part of the gun or a detachable accessory for the gun such as a gas shroud forming chamber. The power pack consists of appropriate circuitry encapsulated in an epoxy resin material that is molded to provide a mounting case in the shape of the forward portion of the spray gun barrel, which it replaces, so that it forms an integral part of the spray gun. The power pack is removably secured to the gun or the gas shroud forming chamber so that it may be detached therefrom for replacement purposes. The power pack is sufficiently small in size and light in weight that when it is connected to the gun or the chamber accessory it does not adversely affect the handling characteristics thereof, and because its location eliminates the need for high voltage insulated input cables to the gun, it in fact increases the mobility of the gun and facilitates its use.

The power pack incorporates a power supply which consists of an oscillator connected through an annular transformer to a voltage multiplier circuit to convert a low voltage DC input signal to a high voltage DC output, the circuit being mounted on printed circuit boards, if desired, and being constructed for compactness and light weight. Because of the nature of an induction spray gun, the voltage and current requirements are such that the power supply can be relatively small in physical size and light in weight. A low voltage input line and a corresponding ground line feed into the spray gun, preferably by way of the air inlet line, and are connected to suitable terminal contacts on the spray gun body, whereby the low voltage is applied to the power pack by way of corresponding contacts on the mounting case when the power pack is connected to the gun. The output of the power pack appears at a high voltage output terminal on the mounting case by means of which the output may be connected through a suitable high voltage lead to the high voltage electrode of an induction charging device secured to, or forming a part of, the spray gun.

This combination of a spray gun-mounted high voltage power pack and an induction charging means is a distinct improvement over the power supplies required for the high voltage corona effect devices of the prior art, for the power pack of the invention is simpler and requires less critical construction. This results in lower production costs for the power packs as well as permitting a lighter weight power supply. Because induction charging devices usually draw a current in the range of about 1 to 5 microamps, and require a voltage of about 5 to 25 kv, as compared to corona effect devices which typically draw output currents in the range of 50-200 microamps and require voltages of over 60 kv, the structural features of the invention could not be accomplished in the prior art.

In a preferred form of the invention, the power pack is mounted on a specially designed or modified spray gun body, rather than upon a conventional, commercially available gun. Although a cylindrical power pack could be molded in a proper shape for attachment to conventional guns, improved handling characteristics, as well as improved appearance, may be obtained by reducing the diameter of the forward portion of the spray gun to provide a central transfer tube which carries the liquid and air lines or channels and which is adapted to receive the power pack module. This arrangement facilitates connection of the power pack to the spray gun body, and permits easy replacement of the power pack in case of failure of the unit in use. The resulting compactness, together with the ease of replacement of the power pack, makes the present unit extremely valuable for field use, permitting an operator to carry a spare unit with him, thereby virtually eliminating work stoppages due to breakdown in the power supply of the gun, while at the same time providing an extremely mobile, easily handled, light-weight and safe spray gun.

In a further modification of the present invention, the power supply circuit may be molded into an accessory detachably mountable upon the spray gun. One such accessory, described in application Ser. No. 718,663 now abandoned filed Aug. 30, 1976 of James E. Sickles, is a cylindrical chamber adapted to be mounted around the spray nozzle and induction charging electrodes of an electrostatic spray gun. The chamber has an inlet for receiving a gas, such as nitrogen or humidity and temperature modified atmospheric air, and an outlet through which the gas exhausts as a protective envelope surrounding the charged spray stream emanating from the spray nozzle. The annular power supply configuration of the present invention is particularly well suited for the gas shroud forming chamber of the mentioned co-pending application inasmuch as the power supply may be molded into a portion of the cylindrical casing of the chamber in the same manner as described herein for the barrel of the spray gun.

BRIEF DESCRIPTION OF THE DRAWINGS

The foregoing and additional objects, features and advantages of the present invention will become apparent to those skilled in the art from a consideration of the following detailed description of a preferred embodiment, taken with the accompanying drawings, in which:

FIG. 1 is a side elevation view of a spray gun incorporating the power supply of the present invention and utilizing an induction charging head;

FIG. 2 is an exploded partial view of the spray gun of FIG. 1, showing the power pack and the modified forward portion of the spray gun;

FIG. 3 is an end view of the power pack of the present invention;

FIG. 4 is a perspective view of the power pack of the present invention, showing a portion of the power supply in phantom;

FIG. 5 is an enlarged, section view of a portion of the spray discharge end of the induction spray gun of FIG. 1;

DESCRIPTION OF A PREFERRED EMBODIMENT

Figure 6:
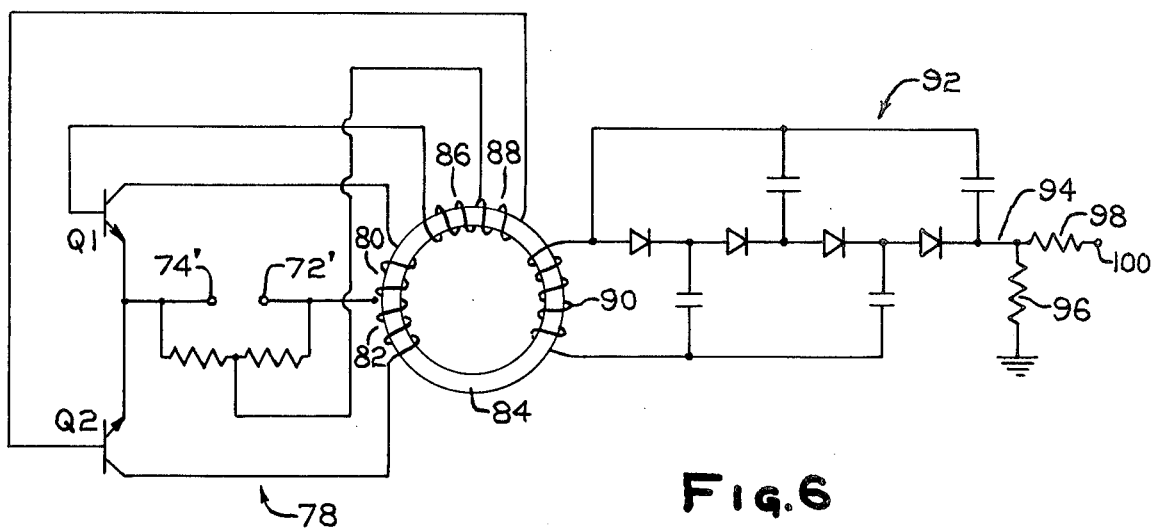
FIG. 6 is a schematic diagram of an electrical power supply adapted for inclusion in the power pack of the present invention.

Turning now to a consideration of the drawings, there is illustrated in FIG. 1, one form of a hand-held induction type electrostatic spray gun utilizing the present invention. The spray gun is generally indicated at 10, and includes a handle portion 12, a rear barrel portion 14, and a forward barrel portion generally indicated at 16. As is conventional in electrostatic spray guns, the spray gun 10 also includes a manually operable trigger 18, suitable liquid valve adjustment means 20, and an electrical control switch 22 which regulates the application of current to the spray gun.

As may be seen more clearly in FIG. 2, the forward portion 16 of the spray gun is formed in two parts, an inner conduit portion 24 which forms a part of, and is an extension of, the rearward barrel portion 14, and an outer cylindrical power pack 26 which is adapted to be removably mounted on the inner portion 24. The power pack 26 is adapted to be secured on the conduit portion 24 to form the forward barrel portion of the spray gun and to provide an integral power supply therefor. As shown in FIGS. 2 and 3, the power pack 26 includes, in its preferred form, a central bore 28 which extends axially therethrough and is adapted to receive the conduit extension 24. The annular power pack is preferably coaxial with the conduit, and may be secured to the spray gun in any suitable manner, as by mating threads on the exterior of the conduit portion 24 and on the surface of the axial bore 28, by means of bolts extending longitudinally through the power supply 26 to engage corresponding threaded holes in the rear barrel portion 14, or by any other suitable means.

As illustrated in FIGS. 3 and 4, the power pack 26 is annular in cross-section, with the axial bore 28 providing a passageway for the conduit portion 24, which carries the material to be sprayed. The outer surface of the power pack and surface of the axial bore define an annular casing which is adapted to receive the electrical circuitry of the power supply to be described. This casing is preferably of an epoxy material which is capable of being molded around the elements of the electrical circuit to hold them firmly in place and protect them from the environment, and which is also capable of being molded to the desired exterior barrel shape for the spray gun, thereby providing maximum protection for the power supply while at the same time ensuring a light-weight and easily handled spray gun. Although the power pack is described as being annular, and preferably is substantially coaxial with the conduit 24, it will be apparent that the power pack may take a variety of exterior shapes and thus may be oblong in cross-section, for example, with the central bore being off-center in one direction or another.

The distal, or forward, end of the barrel portion 16 of the spray gun carries the spraying nozzle and the induction charging head for the spray gun in the manner illustrated in FIGS. 2 and 5. The forward end of the conduit portion 24 is adapted to receive a spray nozzle 30 to provide one or more discharge orifices for the material to be sprayed. An air cap 32 is secured to the face of the barrel portion to provide the air flow required to shape the spray that is emitted from the spray nozzle. In a typical embodiment of the invention, as illustrated in FIG. 5, the conduit 24 incorporates a liquid passageway 34 adapted to carry a paint or other material to be sprayed, and an air passageway 36 adapted to carry pressurized air, as is known.

The liquid to be sprayed is supplied to passageway 34 by way of inlet line 38 (FIG. 1) from a suitable source of liquid under pressure (not shown). The liquid flows through a suitable passageway in the spray gun 10, the flow being controlled by a valve means of conventional design (not shown), to the passageway 34 in conduit portion 24 (FIG. 5). In similar manner, a pressurized source of air (not shown) is supplied by way of inlet line 40 through conventional valve means to the passageway 36. A suitable nozzle such as that illustrated at 30 carries exterior threads 42 which are adapted to engage corresponding interior threads 44 in an aperture 45 formed in the end of conduit portion 24 whereby the nozzle may be threaded into the conduit and secured there. Nozzle 30 includes a central passageway 46 which engages the end of liquid passageway 34 when the nozzle is in place whereby liquid to be sprayed is fed to the nozzle discharge orifice 48. The nozzle also includes an air passageway 50 which engages the air supply passageway 36 when the nozzle is in place, whereby air is supplied under pressure to a plurality of air discharge orifices 52.

Although a particular nozzle structure has been illustrated in the drawings, it will be understood that a variety of spray nozzles may be used with the device, the particular nozzle selected being dependent upon the spray pattern desired, the material being sprayed, and the like.

The air cap 32 includes suitable air passages which engage the orifices 52 of nozzle 30 and distribute the air under pressure around the liquid discharge orifice 48 to provide the desired spray pattern. The air cap preferably is secured over nozzle 30 to the forward end of the spray gun by means of a nut 54 having internal threads which engage the exterior threads 56 on the outer surface of the power pack 26. Preferably, both the nozzle 30 and the air cap 32 are of conventional construction, the passageways 34 and 36 being so arranged within conduit 24 to provide interchangeability with various nozzle and air cap designs, whereby desired spray patterns may be selected.

The electrostatic spray gun 10 is capable of handling a variety of liquids, but has been found in the present embodiment to be particularly useful in spraying electrically conductive liquids. Although it is possible to operate an induction-type electrostatic spray gun in such a way that the spray particles are formed solely by the liquid pressure, in the preferred embodiment of the invention, air under pressure is provided at the orifices 52 to assist in atomizing the liquid.

Secured to the forward end of the barrel portion 16 of spray gun 10 is an induction charging head 60 which surrounds the discharge orifices of the spray gun and induces electrostatic charges on the spray particles, in the manner described in the copending applications of James E. Sickles, Ser. No. 548,958 now U.S. Pat. No. 4,009,829 and Ser. No. 634,386 discussed above. As set forth in those applications, the induction spray head incorporates one or more electrodes to which a DC voltage in the range of 10 to 25 kilovolts is applied, this voltage prcducing a voltage gradient within the charging zone defined by the induction head which is of sufficient value to induce electrostatic charges on sprayed particles discharged from the nozzle orifice 48, whereby the particles may be directed to a suitable target. As set forth in the aforementioned applications, a voltage gradient in the range of 5 to 20 kilovolts per inch extending between the induction charging electrodes carried by head 60 and the liquid outlet port of the spray nozzle is sufficient to induce charges on the spray particles.

In the preferred form of the invention, the liquid to be sprayed is at ground potential, thereby facilitating the handling of the liquid supply and improving operator safety. This contrasts with alternative forms of spray guns wherein the liquid to be sprayed is maintained at the high voltage required to induce charges on the particles. Because the present invention contemplates the use of a grounded liquid supply, a grounding plate 62 may be provided in the liquid passageway 34.

For purposes of illustration there is shown in FIG. 5 a bolt 64 which is adapted to extend through an opening 66 in the casing of the power pack 26 to engage a threaded aperture in the face of the rear barrel portion 14. Such fasteners may be provided to affix the power pack to the spray gun, providing a secure mounting which is easily released to permit replacement of the power pack in the event of failure in the power supply circuit.

The annular power pack 26 incorporates a power supply which is adapted to convert a low voltage input to the high voltage required to operate the induction charging system. The low voltage input, which preferably is a direct current, but which may be an alternating current if desired, is supplied to the spray gun 10 by way of a suitable cable 70 which may be fed through the handle portion 12 of the spray gun either by way of a separate passageway, or through the air supply line 40 in the manner illustrated. The cable 70 includes one "hot" line and one grounded line which lead to a corresponding pair of contact terminals 72 and 74 on the forward wall surface of the body portion 14 of the spray gun. These contacts are adapted to mate with corresponding contacts 72' and 74' mounted on the rear surface of 76 of the annular power pack 26. A suitable power supply circuit, such as that illustrated in FIG. 6, is mounted within the housing, or casing, defined by the surface of the inner bore 28 and the outer surface of the power pack.

The power supply illustrated in FIG. 6 utilizes a square wave oscillator 78 which is connected by way of contacts 72' and 74' and line 70 to a low voltage DC source such as a battery pack or the like. The oscillator comprises a pair of transistors Q1 and Q2 connected in push pull across a pair of primary windings 80 and 82 wound on a transformer core 84. The core is of the tape-wound type and is of a material exhibiting a square hysteresis loop. A pair of feedback windings 86 and 88 are connected to the bases of the transistors Q1 and Q2 in conventional manner to provide the feedback required for oscillation.

A secondary or output winding 90 is wound on the annular core 84 and supplies a conventional voltage multiplier network 92 which provides a high voltage DC on output line 94. This output voltage is in the range of 10 to 25 kilovolts, the voltage depending on the requirements of the spray gun for which it is designed, and is fed across a shunt resistor 96 and through a series regulating resistor 98 to the output terminal 100. The structure and function of resistors 96 and 98 are set forth in greater detail in U.S. Pat. No. 4,073,002 to James E. Sickles and R. M. Tepper, entitled "Self Adjusting Power Supply for Induction Charging Electrode", mentioned above. The output terminal 100 may be mounted on the surface of power pack 26, as indicated in FIGS. 2 and 4, to facilitate connection to the charging electrodes on the induction charging device 60, as by way of connecting cable 102 (FIG. 1).

The oscillator network 78 serves to provide an alternating current supply for the voltage multiplier 92, the frequency and magnitude of the supply being dependent upon the value of the various circuit components, the input voltage, the properties of the core, the number of turns on the primary winding, and the like. Similarly, the output voltage appearing across winding 90 is also dependent on the core properties, the turns ratio of the transformer, and the like, and this voltage is then determinative, together with the number of stages in the voltage multiplier, of the voltage appearing on output line 94. The oscillator 78 is utilized when a DC supply is provided by way of input cable 70; however, the oscillator may be eliminated if a suitable source of AC voltage is available. In the latter event, the AC voltage would be supplied by way of a primary winding on transformer 84 to the secondary winding 90 to provide the desired DC output level.

The output voltage appearing on output line 94 depends upon the requirements of the induction charging device 60. As set forth in the aforementioned copending applications, it is preferred that the voltage be sufficient to provide an average potential gradient of approximately 20 kilovolts per inch within the charging zone defined by the induction charging device. Although the construction of the power supply circuit is generally conventional, it should be noted that the use of an annular ferrite core in this particular arrangement has several advantages. First, the core is of relatively small size and thus is well adapted to the construction of a small, lightweight, disposable power pack. Further, the ferrite core acts as a current limiter to prevent heavy current flow in the event that the charging electrodes should become short circuited. The existance of a short circuit condition causes the power supply to tend to produce a heavy current flow which will, at a certain level, load the ferrite transformer core 84 to a point where there will be no feedback to the oscillator 78, thus cutting off the oscillator and cutting off the flow of short circuit current. This provides a built-in safety factor for the system.

In addition, the annular core is particularly suited to the provision of an annular power pack. Thus, as illustrated in FIG. 4, the transformer may be mounted within the power pack so that the transformer axis coincides with the axis of the power pack, thus allowing the power supply circuitry to be distributed about the circumference of the power pack to provide a weight balance and to enhance the handling characteristics of the spray gun. The power supply circuitry may be assembled on a curved circuit board, or without a circuit board, and is thereafter "potted" or molded in an appropriate compound such as an epoxy resin plastic, "Bakelite" resin plastic, or other dielectric material to provide electrical insulation and mechanical support for the circuit components. Although the circuit components are not illustrated in FIG. 4, it will be understood that these components will be embedded within the dielectric material of the power pack housing and will be electrically connected to the exterior terminals 72', 74' and 100. Thus, the power supply becomes integral with the forward barrel portion of the spray gun to facilitate handling of the gun when it is in operation, and to permit easy replacement of the power supply if it should fail in use.

The placement of the power supply at the forward end of the gun insures that the high voltage required for operation of the induction spray gun is only present at the forward end of the gun, thereby reducing the capacitance of the electrostatic system and increasing the safety of the gun. In addition, the use of a gun-mounted power pack eliminates the requirement for heavy, high voltage insulated lead-in cables, thereby improving the mobility and flexibility of use of the gun. Because the lead-in voltage is of a low value, in the range of 11 volts DC in a preferred embodiment, the power source may be connected to the gun through a low voltage switch 22 for operation by the trigger mechanism 18. This eliminates the high voltage switching required in prior devices, thus substantially reducing the cost of the spray gun.

In a modification of the present invention, the conduit portion 24 of the spray gun may be separate from the body portion 14 and may thus be incorporated in the forward barrel portion 16 of the spray gun. In this arrangement, the conduit is molded within the body of the power pack and forms an integral part thereof, being connected to the rear body portion 14 of the spray gun together with the power pack in the manner described above.

In an alternate embodiment shown in FIG. 7, a cylindrical chamber 110 has an inlet 112 and an outlet 114 defined by an annular end portion 116 and spray nozzle 30. Disposed within outlet 114 is a porous electrode 120 comprising a screen-like conductive material which serves as an induction charging electrode for the spray particles emanating from nozzle 30. In the manner described in greater detail in the aforementioned co-pending application Ser. No. 718,633, now abandoned, a gas received at inlet 112 is formed by the chamber into a shroud which exhausts through outlet 114 and which substantially envelopes the spray stream. The envelope provides an artificial atmosphere which may protect the spray particles from reacting with the ambient atmosphere or from being adversely affected by too high or too low ambient humidity.

Figure 7:
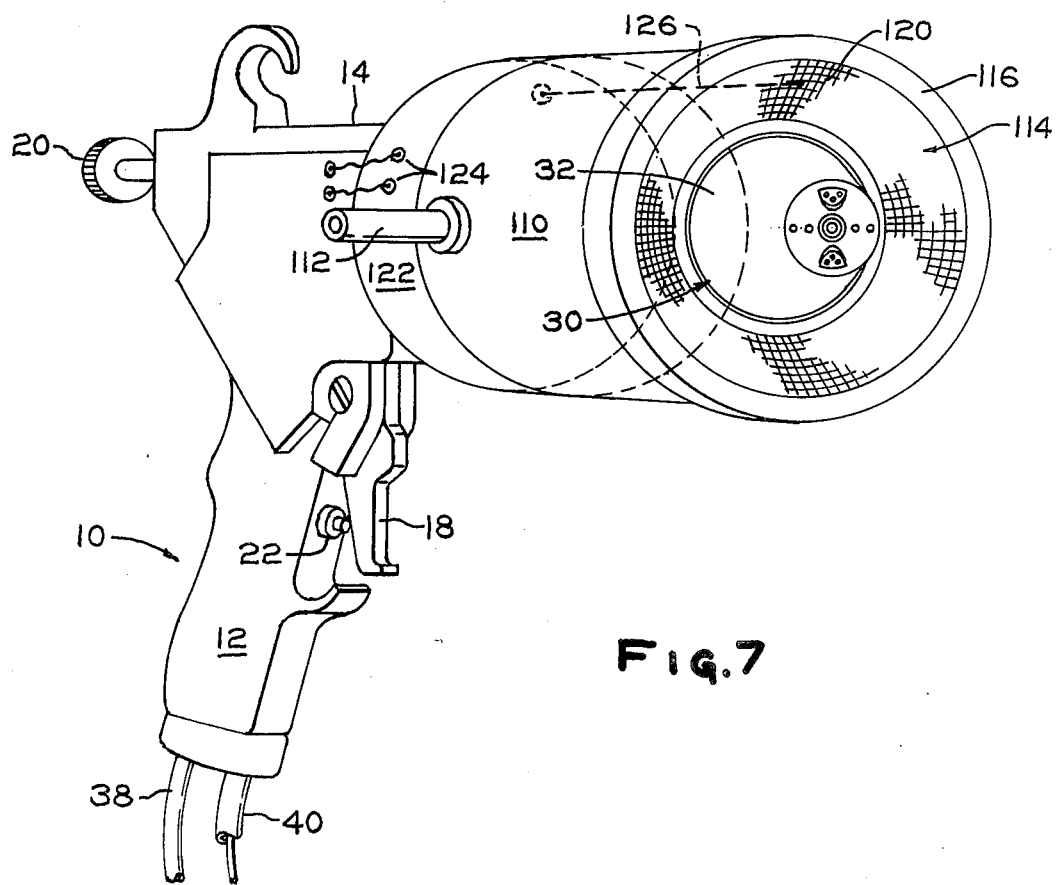
FIG. 7 is a perspective view of another embodiment of the invention in which the power pack has been incorporated into a gas shroud forming accessory.

The cylindrically shaped power supply is well suited to incorporation into the cylindrical gas shroud forming chamber, which chamber may be formed as an integral part of barrel portion 16 or which may be secured to the barrel by a press fit between the chamber rear portion and the barrel, and thus may be detachable therefrom. As shown in FIG. 7, end portion 122 of chamber 110 having a cylindrical configuration may easily incorporate the annular ferrite transformer core 84 and other power supply circuit components illustrated in FIG. 6, in a manner explained in detail above for the annular power pack of FIG. 4. Suitable low voltage connecting means 124 between a power source and the power supply and high voltage connecting means 126 between the power supply and induction charging electrode 120 are provided in a manner similar to that described for the power supply encapsulated in barrel portion 16.

Thus, there has been described a new and improved power supply for use with electrostatic spray guns. This power supply is light in weight, relatively inexpensive to build, and may be mounted directly on the spray gun to form an integral part thereof but is easily replaceable in the event of failure. The small size and light weight of the device and the fact that a low voltage input cable is used reduces by a substantial amount the weight and bulk of the spray gun, and allows easy handling by the operator. The use of batteries as a source of power for the power supply makes the gun easily portable, and serves to reduce operator fatigue. The replacability of the power pack permits an operator to carry a spare when operating the spray gun in the field, so that if a failure should occur the faulty power pack can quickly and easily be replaced with a minimum down time of the spray gun, thus increasing operator productivity. Because the power pack is made of a moldable material to protect the circuit components, it can be adapted to a variety of shapes to provide maximum handling ability.

According to the provisions of the Patent Statutes, there are described above the invention and what are now considered to be its best embodiments. However, within the scope of the appended claims, it is to be understood that the invention can be practiced otherwise than as specifically described.

What is claimed is:

1. In an electrostatic spray apparatus, a spray gun having a barrel portion, at least one fluid passageway for the fluid to be sprayed, fluid valve means for controlling the flow of fluid, nozzle means in said fluid passageway for discharging said fluid in a spray, induction charging means adjacent said spray discharge nozzle, and a light-weight, portable power pack incorporating a power supply for said induction charging means, said power supply being operative to produce a high voltage, low current DC output from a low voltage, low current input, the improvement comprising:

annular casing means for said power pack, said annular casing being molded around said power supply and forming a forward barrel portion of said spray gun and wherein said power supply includes transformer means comprising an annular core, said core having wound thereon an input winding and an output winding;

means for securing said annular casing means to said spray gun;

electrical contact means on said power pack and on said spray gun for connecting said power supply to said spray gun; and means adapted to connect the high voltage output from said power supply to the induction charging means.

2. The spray apparatus of claim 1, wherein said power pack is an integral part of said barrel portion.

3. The spray apparatus of claim 1 further comprising a cylindrical chamber secured to said forward barrel portion and adapted to provide a gaseous envelope for a spray stream emanating from said spray discharge nozzle.

4. The spray apparatus of claim 1, wherein said means for securing said annular casing means to said spray gun includes conduit means carrying said fluid passageway, said conduit means extending forward from the barrel portion of said spray gun and being adapted to receive said annular casing, said conduit means being adapted to extend substantially completely through said annular casing when said casing is mounted on said spray gun.

5. The spray apparatus of claim 4, wherein said conduit means carries the nozzle for said spray gun, the nozzle being located at the distal end of said conduit.

6. The spray apparatus of claim 5, wherein said annular power pack includes means adapted to receive and support an induction charging device at the distal end thereof, said induction charging device surrounding the discharge ports of said nozzle.

7. The spray apparatus of claim 6, wherein said annular transformer means is located within and coaxial with said annular casing means.

8. The spray apparatus of claim 7, wherein said annular casing is a dielectric material shaped to form the barrel portion of said spray gun, said casing being defined by an exterior surface and by a spaced interior surface, said interior surface defining an internal axial bore adapted to receive said conduit.

9. The spray apparatus of claim 1, wherein said annular casing is shaped to form the barrel portion of said spray gun, said casing being defined by an exterior surface and by a spaced interior surface, said interior surface defining an internal axial bore adapted to receive a conduit having a fluid passageway for the fluid to be sprayed, said casing being connected at one end to said spray gun and at the other end to said nozzle means.

10. The spray apparatus of claim 1, wherein said power supply further includes means for connecting a low alternating current voltage to said input winding of said transformer; voltage multiplier means; and means connecting said output winding of said transformer to the input of said voltage multiplier means, whereby said low voltage is converted to produce a high direct current voltage output from said power supply.

11. In an electrostatic spray apparatus, a spray gun having a barrel portion, at least one fluid passageway for the fluid to be sprayed, fluid valve means for controlling the flow of fluid, nozzle means in said fluid passageway for discharging said fluid in a spray, induction charging means adjacent said spray discharge nozzle, and a light-weight, portable power pack incorporating a power supply for said induction charging means, said power supply being operative to produce a high voltage, low current DC output from a low voltage, low current input, the improvement comprising:

annular casing means for said power pack, said annular casing being molded around said power supply and forming a forward barrel portion of said spray gun and wherein said power supply includes annular transformer means;

means for securing said annular casing means to said spray gun;

electrical contact means on said power pack and on said spray gun for connecting said power supply to said spray gun; and means adapted to connect the high voltage output from said power supply to the induction charging means;

wherein said means for securing said annular casing means to said spray gun includes conduit means carrying the fluid passageway, said conduit means extending forwardly from the barrel portion of said spray gun and being adapted to receive said annular casing, said conduit means being adapted to extend substantially completely through said annular casing when said casing is mounted on the spray gun, and wherein said conduit means carries the nozzle for the spray gun, the nozzle being located at the distal end of said conduit.

12. The spray apparatus of claim 11, wherein said annular casing means includes means adapted to receive and support an induction charging device at the distal end thereof, said induction charging device surrounding the discharge ports of said nozzle.

13. The spray apparatus of claim 12, wherein said annular transformer means is located within and coaxial with said annular casing means.

14. The spray apparatus of claim 13, wherein said annular casing means is a dielectric material shaped to form the barrel portion of the spray gun, said casing means being defined by an exterior surface and by a spaced interior surface, said interior surface defining an internal axial bore adapted to receive said conduit.

* * * * *